United States Patent
Seki

[11] Patent Number: 6,013,211
[45] Date of Patent: Jan. 11, 2000

[54] METHOD AND APPARATUS FOR CONTROLLING MOLD CLAMPING FORCE BASED ON DETECTED HYDRAULIC PRESSURES

[75] Inventor: Mitsunori Seki, Nagoya, Japan

[73] Assignee: Kabushiki Kaisha Meiki Seisakusho, Ohbu, Japan

[21] Appl. No.: 09/102,030

[22] Filed: Jun. 22, 1998

[30] Foreign Application Priority Data

Aug. 26, 1997 [JP] Japan ................................. 9-229817

[51] Int. Cl.[7] ................................................. B29C 45/82
[52] U.S. Cl. ....................... 264/40.5; 425/149; 425/150; 425/451.9; 425/595
[58] Field of Search ................................. 264/40.5, 40.1, 264/328.1, 40.7; 425/135, 136, 137, 138, 149, 150, 589, 590, 595, 450.1, 451.2, 451.9

[56] References Cited

U.S. PATENT DOCUMENTS

| | | | |
|---|---|---|---|
| 4,111,629 | 9/1978 | Nussbaumer | 425/590 |
| 4,942,004 | 7/1990 | Catanzaro | 264/40.5 |
| 5,129,806 | 7/1992 | Hehl | 425/135 |
| 5,849,225 | 12/1998 | Ebina | 264/40.5 |

Primary Examiner—Jill L. Heitbrink
Attorney, Agent, or Firm—Wall Marjama Bilinski & Burr

[57] ABSTRACT

Mold clamping method and apparatus wherein a mold closing chamber of a mold clamping device is supplied with a pressurized fluid delivered from a hydraulic power source through a servo valve, to close a mold, and a mold clamping chamber independent of the mold closing chamber is also supplied with the pressurized fluid through the servo valve and a switch valve opened upon completion of the mold closing action, to thereby clamp the mold, and wherein a controller is provided to obtain a mold clamping force on the basis of a sum of a first force based on a fluid pressure in the mold closing chamber and a second force based on a fluid pressure in the clamping chamber, and feedback-control the servo valve such that the obtained mold clamping force coincides with a desired value.

11 Claims, 2 Drawing Sheets

METHOD AND APPARATUS FOR CONTROLLING MOLD CLAMPING FORCE BASED ON DETECTED HYDRAULIC PRESSURES

BACKGROUND OF THE INVENTION

1. Field of the Invention

The present invention relates in general to a method and a system for controlling a mold clamping apparatus including a mold clamping device having a main cylinder chamber and an auxiliary cylinder chamber for rapidly opening and closing a mold and clamping the mold in the closed position with a high pressure. More particularly, the present invention is concerned with technologies for effectively shortening a cycle time of a forming operation using the mold, by shortening the time required to close and clamp the mold, and for improving the accuracy of control of the mold clamping force.

2. Discussion of the Related Art

As a device for clamping a mold used for an injection molding machine, for example, there is known a mold clamping device having a main cylinder chamber and an auxiliary cylinder chamber for moving a movable plate with a movable mold half fixed thereto toward a stationary plate having a stationary mold half fixed thereto, and a mold opening cylinder chamber for moving the movable plate away from the stationary plate. Those cylinder chambers are provided independently of each other. For instance, there are known a booster ram type mold clamping device and a side cylinder type mold clamping device. The mold clamping device of the booster ram type includes a main ram which defines the main cylinder chamber as a mold clamping chamber and a mold closing chamber on its opposite sides, and which has the auxiliary cylinder chamber as a mold closing chamber. The mold clamping device of the side cylinder type includes a main cylinder having the main cylinder chamber as a mold clamping chamber, and auxiliary cylinders which are disposed around the main cylinder and each of which includes a piston defining the auxiliary cylinder chamber as a mold closing chamber and a mold opening chamber on its opposite sides. The main cylinder chamber functioning as the mold clamping chamber has a larger effective pressure-receiving area than the auxiliary cylinder chamber functioning as the mold closing chamber. A mold clamping apparatus including such a mold clamping device includes a hydraulic device having pumping means for delivering a pressurized working fluid into the mold closing chamber to close the mold at a relatively high velocity, and a switch valve which is opened to apply the pressure of the working fluid to the mold clamping chamber as well as the mold closing chamber, to clamp the mold with a sufficiently large clamping force. A suitable material is injected into the closed and clamped mold, and the pressurized fluid is delivered into the mold opening chamber to open the mold, to remove an article formed by injection molding.

The hydraulic device of such a mold clamping apparatus uses a servo valve for controlling the mold closing and opening velocities and the mold clamping force. That is, the servo valve is capable of controlling the pressure and the rate of flow of the working fluid supplied to the mold closing, clamping and opening chambers. The hydraulic device preferably includes a surge valve connected to the mold clamping chamber (main cylinder chamber) which prevents the generation of a negative or reduced pressure in the mold clamping chamber when the mold is closed with the pressurized fluid being applied to the mold closing chamber, and prevents the pressure in the mold clamping chamber from being raised when the mold is opened with the pressurized fluid being applied to the mold opening chamber.

In the conventional mold clamping system, the switch valve is provided in a fluid passage connecting the servo valve and the mold closing chamber. Upon closing of the mold, the switch valve is opened so that the pressure of the pressurized fluid delivered from the servo valve to the mold closing chamber is also applied to the mold clamping chamber. Described more specifically, the switch valve is initially placed in the closed position, so that the pressurized fluid is supplied from the servo valve to only the mold closing chamber. When the movable plate with the movable mold half fixed thereto has been moved to a predetermined mold closing position, this position is detected by a position sensor, and the switch valve is opened to supply the pressurized fluid to the mold clamping chamber as well as the mold closing chamber. In the mold clamping operation, the hydraulic pressure to be applied to the mold clamping chamber is controlled in a feedback or closed-loop control fashion, so that the hydraulic pressure coincides with a predetermined value corresponding to a desired mold clamping force by which the mold is held in the closed position. For the closed-loop control of the mold clamping force, the pressure in the mold closing chamber detected by a pressure sensor is generally used as the pressure in the mold clamping chamber, since the pressurized fluid is supplied to the mold clamping chamber through the fluid passage connecting the servo valve and the mold closing chamber. The pressure to be applied to the mold clamping chamber as well as the mold closing chamber is controlled on the basis of the output signal of the pressure sensor.

Since the pressurized fluid is supplied to the mold clamping chamber through the switch valve connected to the fluid passage indicated above, the pressure in the mold clamping chamber is not raised to the level of the pressure in the mold closing chamber until the opening action of the switch valve is completed. Therefore, the initiation of the feedback control of the fluid pressure to control the mold clamping force should be delayed from the point of time at which the mold closing action is completed (at which the switch valve is commanded to be opened). An appropriate delay time after the completion of the mold closing action and before the initiation of the mold clamping force is measured by a timer or time counter, so that the control of the mold clamping force is initiated when the delay time has passed. Accordingly, the rise of the mold clamping force is delayed, and the required cycle time of a forming operation with the mold is undesirably increased.

Another problem exists in the presence of the switch valve between the mold clamping chamber and the fluid passage connected to the mold closing chamber. Namely, the pressure in the mold clamping chamber does not accurately coincide with the pressure in the mold closing chamber, due to pressure losses in the switch valve and fluid passage connecting the switch valve and the mold clamping chamber. Accordingly, the feedback control of the mold clamping force cannot be achieved with a sufficiently high degree of accuracy.

SUMMARY OF THE INVENTION

It is therefore a first object of the present invention to provide a method of controlling a mold clamping force generated by a mold clamping apparatus having a main cylinder chamber as a mold clamping chamber and an auxiliary cylinder chamber as a mold closing chamber, which method permits the initiation of the feedback control of the mold clamping force upon completion of the mold closing action, without waiting for the completion of an opening action of a switch valve connected to the mold clamping chamber, thereby shortening the cycle time of a forming operation using the mold.

It is a second object of the invention to provide a mold clamping system suitable for practicing the method indicated above.

The first object may be achieved according to a first aspect of this invention, which provides a method of controlling a clamping force of a mold consisting of a movable mold half fixed to a movable plate and a stationary mold half fixed to a stationary plate, in a mold clamping apparatus including a mold clamping device and a hydraulic device, the mold clamping device having a mold closing chamber and a mold clamping chamber for moving the movable plate toward the stationary plate, and a mold opening chamber for moving the movable plate away from the stationary plate, the mold closing, clamping and opening chambers being independent of each other, the hydraulic device including pumping means, a servo valve and a switch valve, the pumping means initially delivering a pressurized working fluid to the mold closing chamber through the servo valve, to move the movable plate toward the stationary plate for thereby closing the mold, and then delivering the pressurized working fluid to the mold clamping chamber through the switch valve as well as the servo valve, to force the movable mold half against the stationary mold half for thereby clamping the mold, the method comprising the steps of: obtaining a mold clamping force for clamping the mold, on the basis of a sum of a first force based on a pressure in the mold closing chamber and a second force based on a pressure in the mold clamping chamber; and feedback-controlling the servo valve such that the mold clamping force coincides with a desired value.

The mold clamping chamber may be a main cylinder chamber defined by the housing of a main cylinder and a main ram which carries the movable plate fixed at its one end and which is slidably fitted in the main cylinder. In this case, the mold closing chamber may be an auxiliary cylinder chamber defined by a center hole formed in the main ram and a booster ram which is fixed to the main cylinder housing and is slidably inserted in the center hole. Alternatively, the mold closing chamber may be provided by a plurality of side cylinders which are separate from the main cylinder and which are disposed around the main cylinder. In each side cylinder, there is slidably disposed a piston which is connected to the movable plate through a piston rod. The pistons of the side cylinders cooperate with the housing of the side cylinder to define a plurality of side cylinder chambers on one side of each piston. These side cylinder chambers collectively function as the mold closing chamber. On the other hand, the mold opening chamber may be formed on the side of a large-diameter portion of the main ram which is remote from the main cylinder chamber (mold clamping chamber), or may be provided by side cylinder chambers formed on the other side of the pistons of the side cylinders.

In the mold clamping method according to the present invention, the pressures of the working fluid in the mold closing and clamping chambers are detected independently of each other, and the mold clamping force is controlled on the basis of the fluid pressure in the mold closing chamber as well as the fluid pressure in the mold clamping chamber. That is, the servo valve is feedback-controlled on the basis of the sum of the first force based on the pressure in the mold closing chamber and the second force based on the pressure in the mold clamping chamber. This feedback control is initiated immediately after the switch valve is commanded to be opened upon completion of the mold closing action of the mold with the pressurized fluid being supplied to the mold closing chamber through the servo valve. Namely, the feedback control of the servo valve is initiated even before the fluid pressure in the mold clamping chamber has been raised to the level of the pressure in the mold closing chamber.

Thus, the feedback control of the servo valve to control the mold clamping force can be achieved with high accuracy, without waiting for the completion of the opening action of the switch valve after the completion of the mold closing action. Accordingly, the required cycle time of a forming operation using the mold can be shortened, without a conventionally provided delay time after the mold closing operation is completed and before the feedback control of the servo valve is initiated. In the absence of the delay time, the feedback control is accordingly simplified.

The sum F of the first force based on the pressure "a" in the mold closing chamber and the second force based on the pressure "b" in the mold clamping chamber is obtained according to the following equation:

$$F = B \cdot b + A \cdot a$$

wherein "A" represents an effective pressure-receiving surface area partially defining the mold closing chamber, while "B" represents an effective pressure-receiving surface area partially defining the mold clamping chamber.

In the present method, the servo valve is controlled such that the mold clamping force F coincides with a desired value.

In one preferred form of the method of the present invention, the step of obtaining a mold clamping force comprises obtaining an actual mold clamping force by subtracting a third force based on a pressure in the mold opening chamber from the sum of the first and second forces, and the step of feedback-controlling the servo valve comprises feedback-controlling the servo valve to control the pressure in the mold clamping force such that the actual mold clamping force coincides with a desired mold clamping force.

In the above preferred form of the method, the third force based on the pressure in the mold opening chamber, which provides a resistance to the movement of the movable plate toward the stationary plate, is also taken into account in controlling the servo valve, so that the actual mold clamping force can be controlled with higher accuracy, even where there exists a comparatively large resistance to supply and discharge flows of the working fluid into and from the mold opening chamber. Accordingly, the supply and discharge flows of the fluid into and from the mold opening chamber can be controlled through the servo valve which is used for controlling the flows of the fluid to and from the mold closing and clamping chambers, whereby the hydraulic device of the mold clamping apparatus can be simplified in construction, and the control of the mold opening action is facilitated.

The actual mold clamping force F' is obtained according to the following equation:

$$F' = B \cdot b + A \cdot a - C \cdot c$$

wherein "C" represents an effective pressure-receiving surface area partially defining the mold opening chamber, while "c" represents the pressure in the mold opening chamber.

In another preferred form of the method, the hydraulic device further includes a reservoir, and a surge valve connected between the mold clamping chamber and the reservoir to permit the working fluid to be introduced from the reservoir into the mold clamping chamber when the pressurized working fluid is delivered to the mold closing chamber to close the mold. In this case, the method further comprises the steps of: obtaining a mold closing force for closing the mold, by subtracting a third force based on a pressure in the mold opening chamber from the first force based on the pressure in the mold closing chamber; and feedback-controlling the servo valve during a closing action of the mold, on the basis of the obtained mold closing force.

In the above form of the method, the resistance force based on the pressure in the mold opening chamber as well as the force based on the pressure in the mold closing chamber is taken into account in controlling the servo valve while the mold is closed, whereby the mold closing force can be controlled with high accuracy during the closing action of the mold with the pressurized fluid being supplied to the mold closing chamber. For instance, the servo valve is controlled so as to prevent the obtained mold closing force from exceeding a predetermined upper limit, for thereby avoiding damaging of the mold due to a foreign matter which may be present between the movable and stationary mold halves.

Since the mold closing force can be controlled with high accuracy, even where there exists a comparatively large resistance to supply and discharge flows of the working fluid into and from the mold opening chamber, the supply and discharge flows of the fluid into and from the mold opening chamber can be controlled through the servo valve which is used for controlling the flows of the fluid to and from the mold closing and clamping chambers, whereby the hydraulic device of the mold clamping apparatus can be simplified in construction, and the control of the mold opening action is facilitated. Further, the surge valve connected to the mold clamping chamber permits the working fluid to be introduced from the reservoir into the mold clamping chamber when the fluid is delivered to the mold closing chamber to close the mold, so that the generation of a reduced pressure of the fluid in the mold clamping chamber during the mold closing action is avoided, whereby the mold closing action is not influenced by the reduced or negative pressure in the mold clamping chamber, and the accuracy of control of the mold closing force is accordingly improved.

The mold closing force F(a) is obtained according to the following equation:

$$F(a)=A \cdot a - C \cdot c$$

In a further preferred form of the method, the hydraulic device further includes a reservoir, and a surge valve connected between the mold clamping chamber and the reservoir, the surge valve being opened to permit the working fluid to be discharged from the mold clamping chamber into the reservoir through the surge valve, by application of a pilot pressure to the surge valve when the pressurized working fluid is delivered through the servo valve to the mold opening chamber to open the mold, the method further comprising the steps of: obtaining a mold opening force for opening the mold, by subtracting the first force based on the pressure in the mold closing chamber from a third force based on a pressure in the mold opening chamber; and feedback-controlling the servo valve during an opening action of the mold, on the basis of the obtained mold opening force.

In the above preferred form of the method, the resistance force based on the pressure in the mold closing chamber as well as the force based on the mold opening chamber is taken into account in controlling the servo valve during the mold opening action, so that the mold opening force can be controlled with high accuracy. Since the mold opening force can be controlled with high accuracy even where there exists a comparatively large resistance to supply and discharge flows of the working fluid into and from the mold closing chamber, the supply and discharge flows of the fluid into and from the mold closing chamber can be controlled through the servo valve which is used for controlling the flows of the fluid to and from the mold clamping chamber, whereby the hydraulic device of the mold clamping apparatus can be simplified in construction. Further, the surge valve connected to the mold clamping chamber permits the working fluid to be discharged from the mold clamping chamber into the reservoir by application of a pilot pressure to the surge valve when the fluid is delivered to the mold opening chamber to open the mold, so that a rise of the pressure of the fluid in the mold clamping chamber is avoided during the mold opening action, whereby the mold opening action is not influenced by the raised pressure in the mold clamping chamber, and the accuracy of control of the mold opening force is accordingly improved.

The mold opening force F(c) is obtained according to the following equation:

$$F(c)=C \cdot c - B \cdot b$$

The second object indicated above may be achieved according to a second aspect of the present invention, which provides a mold clamping system for controlling a clamping force of a mold consisting of a movable mold fixed to a movable plate and a stationary mold fixed to a stationary plate, the mold clamping system including a mold clamping apparatus and a control device, the mold clamping apparatus including a mold clamping device and a hydraulic device, the molding clamping device having a mold closing chamber and a mold clamping chamber for moving the movable plate toward the stationary plate, the mold closing and clamping chambers being independent of each other, the hydraulic device including a pumping means, a servo valve and a switch valve, the control device controlling the servo valve and the switch valve such that a pressurized working fluid is initially delivered from the pumping means to the mold closing chamber through the servo valve, to move the movable plate toward the stationary plate for thereby closing the mold, and is then delivered to the mold clamping chamber through the switch valve as well as the servo valve, to force the movable mold half against the stationary mold half for thereby clamping the mold, wherein the control device comprises: (a) a position sensor for detecting a closed position of the mold; (b) a first pressure sensor for detecting a pressure of the working fluid in the mold closing chamber; (c) a second pressure sensor for detecting a pressure of the working fluid in the mold clamping chamber; and (d) a controller for opening the switch valve, upon detection of the closed position of the mold by the position sensor, to deliver the pressurized working fluid from the pumping means to the mold clamping chamber as well as the mold closing chamber, the controller including clamping force obtaining means for obtaining a mold clamping force for clamping the mold, on the basis of a sum of a first force based on the pressure detected by the first pressure sensor and a second force based on the pressure detected by the second pressure sensor, and servo valve controlling means for feedback-controlling the servo valve such that the mold clamping force coincides with a desired value.

In the present mold clamping system, the pressures in the mold closing and clamping chambers are detected by the respective first and second pressure sensors, independently of each other, and the controller obtains the mold clamping force on the basis of not only the force based on the pressure in the mold clamping chamber detected by the second pressure sensor, but also the force based on the pressure in the mold closing chamber detected by the first pressure sensor. Accordingly, the servo valve can be feedback-controlled to control the mold clamping force, with high accuracy, even during the opening action of the switch valve, that is, even before the fluid pressure in the mold clamping chamber has not been raised to the level of the pressure in the mold closing chamber.

Thus, the feedback control of the servo valve to control the mold clamping force in the present mold clamping system can be achieved with high accuracy, without waiting for the completion of the opening action of the switch valve after the completion of the mold closing action. Accordingly, the required cycle time of a forming operation using the mold can be shortened, without a conventionally provided delay time after the mold closing operation is completed and before the feedback control of the servo valve is initiated. In the absence of a timer for measuring the delay time, the control device is accordingly simplified.

BRIEF SUMMARY OF THE INVENTION

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
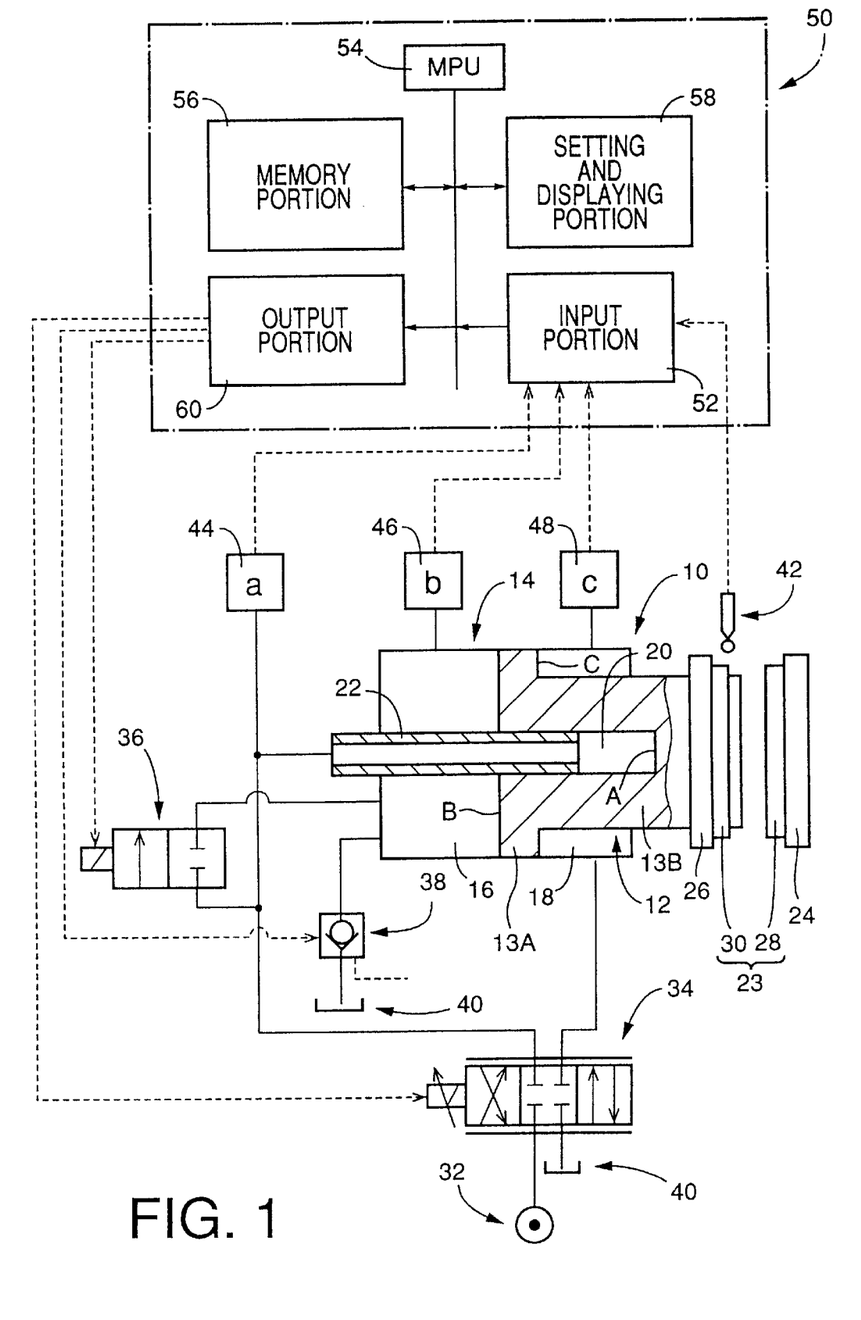
FIG. 1 is a view schematically showing a mold clamping system including a booster ram type mold clamping device and a control device for controlling a mold clamping pressure of the mold clamping device according to one embodiment of this invention.

Referring first to FIG. 1, there is schematically shown the mold clamping system including a mold clamping apparatus which includes a booster ram type mold clamping device 10. The mold clamping system further includes a control device for controlling a mold clamping pressure of the mold clamping device 10 according to one embodiment of this invention.

The booster ram type mold clamping device 10 includes a main cylinder 14, and a main ram 12 which is slidably movable within a bore of the main cylinder 14. The main ram 12 includes a large-diameter portion 13A which is always located within the bore of the main cylinder 14, and a small-diameter portion 13B which is formed integrally with the large-diameter portion 13A. The small-diameter portion 13B has an end portion remote from the large-diameter portion 13A, which end portion projects from the bore of the main cylinder 14 in a direction toward a mold closing position of the main ram 12 (which will be described). The main ram 12 cooperates with the housing of the main cylinder 14 to define a main cylinder chamber in the form of a cylindrical mold clamping chamber 16, and an annular mold closing chamber 18. Described in detail, the mold clamping chamber 16 is partly defined by the end face of the large-diameter portion 13A remote from the small-diameter portion 13B. On the other hand, the annular mold closing chamber 18 is partly defined by an annular surface of the large-diameter portion 13A opposite to the above-indicated end face, and the outer circumferential surface of the small-diameter portion 13B. Thus, the main ram 12 and the main cylinder 14 constitute a double-acting cylinder-piston mechanism.

The main ram 12 has a center hole 20 formed so as to extend in its axial direction and open in the end face of the large-diameter portion 13B which partially defines the mold clamping chamber 16. A hollow booster ram 22 is fixed at one of its opposite end portions to the main cylinder 14, and extends through the mold clamping chamber 16 such that the other end portion of the booster ram 22 is inserted into the hole 20, so as to permit the main ram 12 to be slidably and fluid-tightly movable relative to the booster ram 22 in the axial direction. The center hole 20 provides an auxiliary cylinder chamber in the form of a mold closing chamber which has a smaller volume than the mold clamping chamber 16 (main cylinder chamber) and which is independent of the mold clamping chamber 16. Thus, the main ram 12 and the booster ram 22 constitute another cylinder-piston mechanism.

The mold clamping device 10 is adapted to clamp a mold 23, which is used for an injection molding machine, for example. The mold 23 includes a stationary mold half 28 secured to a stationary plate 24, and a movable mold half 30 secured to a movable plate 26. The stationary and movable plates 24, 26 are disposed near the front end of the small-diameter portion 13B of the main ram 12, which is remote from the large-diameter portion 13A. The stationary plate 24 is supported by the housing of the main cylinder 14 through a plurality of tie bars, as well known in the art. The movable plate 26 is attached to the end face of the small-diameter portion 13B of the main ram 12, such that the movable mold half 30 secured to the movable plate 26 is opposed to the stationary mold half 28 secured to the stationary plate 24. When the main ram 12 is hydraulically moved to the mold closing position, as described below in detail, the movable mold half 30 is moved with the movable plate 26 to a predetermined closed position in which the stationary and movable mold halves 28, 30 define a mold cavity. Thus, the mold 23 is closed. The mold 23 is opened with the main ram 12 moved to its mold opening position of FIG. 1.

The mold clamping apparatus including the booster ram type mold clamping device 10 constructed as described above further includes a hydraulic device including a hydraulic pressure source 32 having pumping means including a hydraulic pump and a pump drive motor. The hydraulic device further includes a solenoid-operated servo valve 34 for supplying a hydraulic working fluid pressurized by the hydraulic pressure source 32, to the mold closing chamber 20 or the mold opening chamber 18, and for permitting the working fluid to be discharged from those chambers 20, 18 into a reservoir 40. The hydraulic device further includes a switch valve in the form of a solenoid-operated switch valve 36 connected to a fluid passage which connects the servo valve 34 and the mold closing 20. When the servo valve 34 is placed in a position for applying the hydraulic pressure from the hydraulic pressure source 32 to the mold closing chamber 20, the hydraulic pressure may also be applied to the mold clamping chamber 16 by opening the switch valve 36.

To the mold clamping chamber 16, there is connected a pilot-operated surge valve 38 functioning as a check valve connected to the reservoir 40. When a pilot pressure is not applied to the surge valve 38, it inhibits a discharge flow of the fluid from the mold clamping chamber 16 into the reservoir 40, but permits a flow of the fluid from the reservoir 40 into the mold clamping chamber 16 when the main ram 12 is moved to the mold closing position. In other words, the surge valve 38 permits the mold clamping chamber 16 to be kept filled with the working fluid while the volume of the chamber 16 is increased during a closing action of the mold 23. Thus, the surge valve 38 prevents generation of a reduced pressure in the mold clamping chamber 16 when the mold 23 is closed by application of the hydraulic pressure to the mold closing chamber 20. When the main ram 12 is moved to its mold opening position by application of the hydraulic pressure to the mold opening chamber 18, a pilot pressure is applied to the surge valve 38, so that the surge valve 38 is opened to permit the working fluid to be discharged from the mold clamping chamber 16 into the reservoir 40, thereby preventing an increase in the pressure in the mold clamping chamber 16 when the mold 23 is opened. The pilot pressure is applied to the surge valve 38 when a solenoid coil of a pilot valve incorporated in the surge valve 38 is energized.

When the mold 23 is closed the electric current to be applied to the solenoid coil of the solenoid-operated servo valve 34 is controlled to move a valve spool to a mold closing position for applying the hydraulic pressure of the hydraulic pressure source 32 to the mold closing chamber 20 and permitting the the working fluid in the mold opening chamber 18 to be discharged into the reservoir 40. In this mold closing position, therefore, the main ram 12 is moved to its mold closing position at a relatively high velocity, so that the movable mold half 30 is moved to its closed position. When the mold 23 is thus closed, the surge valve 38 permits the fluid to be delivered from the reservoir 40 into the mold clamping chamber 16.

When the predetermined mold closing position of the main ram 12 (corresponding to the predetermined closed position of the movable mold half 30) is detected at the end of the mold closing operation, the solenoid coil of the switch valve 36 is energized to open the switch valve 36, to permit the pressurized fluid to be delivered from the hydraulic pressure source 32 to the mold clamping chamber 16 as well as the mold closing chamber 20. As a result, the main ram 12 is forced in the mold closing direction with a sum of a force based on the pressure in the mold closing chamber 20 and a force based on the pressure in the mold clamping chamber 16. Thus, the mold 23 is clamped with the movable mold half 30 being forced against the stationary mold half 28 by the main ram 12.

While the mold 23 is placed in its closed position with the movable and stationary mold halves 28, 30 being clamped together by the mold clamping device 10 as described above, a resin material is injected into the mold cavity, and is then cooled and solidified. Then, the solenoid coil of the switch valve 36 is de-energized to close the switch valve 36, and the electric current applied to the solenoid-coil of the servo valve 34 is controlled to move the valve spool to a mold opening position for applying the hydraulic pressure of the hydraulic pressure source 32 to the mold opening chamber 18 and permitting the working fluid in the mold clamping chamber 20 to be discharged into the reservoir 40. In this mold opening position, therefore, the main ram 12 is moved so as to open the mold 23, that is, to move the movable plate 26 and the movable mold half 30 away from the stationary plate 24 and the stationary mold half 28. During this mold opening action of the mold 23, the pilot pressure is applied to the surge valve 38 so that the valve 38 is open to permit the working fluid in the mold clamping chamber 16 to be discharged into the reservoir 40, so that the fluid i the mold clamping chamber 16 does not disturb a movement of the main ram 12 back to its mold opening position.

The control device indicated above includes a controller 50 for controlling the hydraulic device including the hydraulic pressure source 32 and the servo valve 34 and switch valve 36, when the mold 23 is opened, clamped and closed. In particular, the control device 50 controls the velocity at which the mold 23 is closed and opened, and the pressure or force by which the movable and stationary mold halves 28, 30 are clamped together, as described below in detail. The control device further includes a position sensor in the form of a limit switch 42 fixed to the main cylinder 14 for detecting the mold closing position of the main ram 12, a first pressure sensor 44 for detecting the pressure in the mold closing chamber 20, a second pressure sensor 46 for detecting the pressure in the mold clamping chamber 16, and a third pressure sensor 48 for detecting the pressure in the mold opening chamber 18. These limit switch and pressure sensors 42, 44, 46, 48 are connected to the controller 50.

The controller 50 includes an input portion 52 adapted to receive the output signals of the limit switch 42 and the pressure sensors 44, 46, 48, a micro processor unit (MPU) 54, a memory portion 56, a setting and display portion 58 and an output portion 60. The memory portion 56 stores control programs for controlling the mold clamping apparatus, and the micro processor unit 54 processes the signals received from the input portion 52, according to the control programs and based on the signals received from the setting and display portion 58. The micro processor unit 54 generates control signals, which are applied to the solenoid-operated servo valve 34 and switch valve 36 and the surge valve 38 through the output portion 60.

The main ram 12 has an effective pressure-receiving surface area A which partially defines the mold closing chamber 20, an effective pressure-receiving surface area B which partially defines the mold clamping chamber 16, and an effective pressure-receiving surface area C which partially defines the mold opening chamber 18. A mold closing force F(a) by which the mold 23 is closed is obtained according to the following equation (1):

$$F(a) = A \cdot a - C \cdot c \qquad (1)$$

where, a = pressure in the chamber 20 as detected by the first pressure sensor 44
c = pressure in the chamber 18 as detected by the third pressure sensor 48.

While the main ram 12 is moved to close the mold 23, the pressure of the working fluid to be applied to the mold closing chamber 20 is controlled by controlling the electric current applied to the servo valve 34, so that the mold closing force F(a) does not exceed a predetermined upper limit, in order to prevent a damage of the mold 23 due to a foreign matter which may exist between the stationary and movable mold halves 28, 30.

It is desirable to decelerate the main ram 12 immediately before the main ram 12 has reached the predetermined mold closing position detected by the limit switch 42, that is, when the main ram 12 has reached a slowdown position close to the mold closing position. In this case, the electric current applied to the servo valve 34 is changed to reduce the mold closing force F(a) when the slowdown position of the main ram 12 is detected by a suitable position sensor. In this arrangement, the main ram 12 is advanced to the slowdown position at a relatively high speed with the relative low pressure applied to the mold closing chamber 20, and is advanced to the mold closing position at a relatively low speed with the relatively high pressure applied to the mold closing chamber 20. This arrangement is effective to prevent damaging of the mold 23 due to collision of the movable mold half 30 with the stationary mold half 28, while minimizing the time required for closing the mold 23.

Upon detection of the predetermined mold closing position of the main ram 12 by the limit switch 42, the switch valve 36 is opened by the controller 50. A mold clamping force F' by which the mold 23 is clamped is obtained according to the following equation:

$$F'=B \cdot b+A \cdot a-C \cdot c \qquad (2)$$

where, b=pressure in the chamber 16 as detected by the second pressure sensor 46.

The servo valve 34 is controlled to control the pressure in the mold clamping chamber 16 and the mold closing chamber 20, so that the mold clamping force F' coincides with a predetermined desired value. To this end, for example, the servo valve 34 is controlled to regulate the pressure in the mold clamping chamber 16 (and the mold closing chamber 20), in a feedback or closed-loop control fashion, so as to zero a difference or error "e" between the mold clamping force F' calculated according to the above equation (2) and the predetermined desired or target value.

After the cavity of the mold 23 thus closed and clamped is filled with a resin material injected therein, the mold 23 is kept closed for a predetermined cooling and solidifying time, which is measured by a suitable timer or time counter. When the predetermined cooling and solidifying time has passed, the controller 50 commands the servo valve 34 to move its spool to its mold opening position for opening the mold 23. A mold opening force F(c) by which the main ram 12 is retracted to its mold opening position of FIG. 1 is obtained according to the following equation (3):

$$F(c)=C \cdot c-A \cdot a \qquad (3)$$

The servo valve 34 is controlled to regulate the pressure in the mold opening chamber 18, while monitoring the mold opening force F(c).

When the predetermined mold opening position of the main ram 12 is detected by a suitable position sensor, the spool of the servo valve 34 is brought to the neutral position of FIG. 1, and a product formed by the injection molding operation is released or removed from the mold 23. As described above, an injection molding cycle includes the steps of closing and clamping the mold 23, injecting, cooling and solidifying the resin material, opening the mold 23 and removing the formed product. This injection molding cycle is repeatedly performed to successively form the desired product.

Thus, the controller 50 is arranged to start controlling the solenoid-operated servo valve 34 so as to regulate the mold clamping force F', at the time when the application of the hydraulic pressure to the mold clamping chamber 16 as well as the mold closing chamber 20 is initiated with the solenoid-operated switch valve 36 being opened. This mold clamping force F' is based on both of the pressures "a" and "b" in the mold closing and clamping chambers 20, 16. Further, the second pressure sensor 46 is provided to detect the pressure "b" in the mold clamping chamber 16, in addition to the first pressure sensor 44 for detecting the pressure "a" in the mold closing chamber 20, so that the control of the mold clamping force F' can be initiated without having to wait for an increase of the pressure in the mold clamping chamber 16 after the switch valve 36 has been opened to initiate the application of the hydraulic pressure to the mold clamping chamber 16. Namely, the control of the servo valve 34 can be initiated when the predetermined mold closing position of the main ram 12 has been detected, that is, upon termination of the mold closing action of the mold 23. Yet, the mold clamping force F' can be controlled with high accuracy. Thus, the present mold clamping system including the controller 50 provides an improvement in the injection molding efficiency with a reduced cycle time, and an improvement in the injection molding stability owing to an improved accuracy of control of the mold clamping force F'.

The controller 50 is arranged to take into account the pressure "c" in the mold opening chamber 18 into account as well as the pressures "b" and "c", in controlling the mold clamping force. The pressure "c" generates the force C·c resisting the movement of the main ram 12 to the mold closing position. This arrangement provides a further improvement in the control accuracy of the mold clamping force.

In the present embodiment, the mold closing force F(a) is obtained by taking into account the force C·c based on the pressure "c" in the mold opening chamber 18, which force resists the movement of the main ram 12 to the mold closing position, since there exists a certain resistance to the flow of the working fluid from the chamber 18 into the reservoir 40 through the servo valve 34. Similarly, the mold opening force F(c) is obtained by taking into account the force A·a based on the pressure "a" in the mold closing chamber 20, which force resists the movement of the main ram 12 to the mold opening position, since there exists a certain resistance to the flow of the working fluid from the chamber 20 into the reservoir 40 through the servo valve 34. Accordingly, the accuracy of control of the mold closing and opening forces F(a) and F(c) is considerably improved, leading to increased opening and closing stability of the mold 23.

Figure 2:
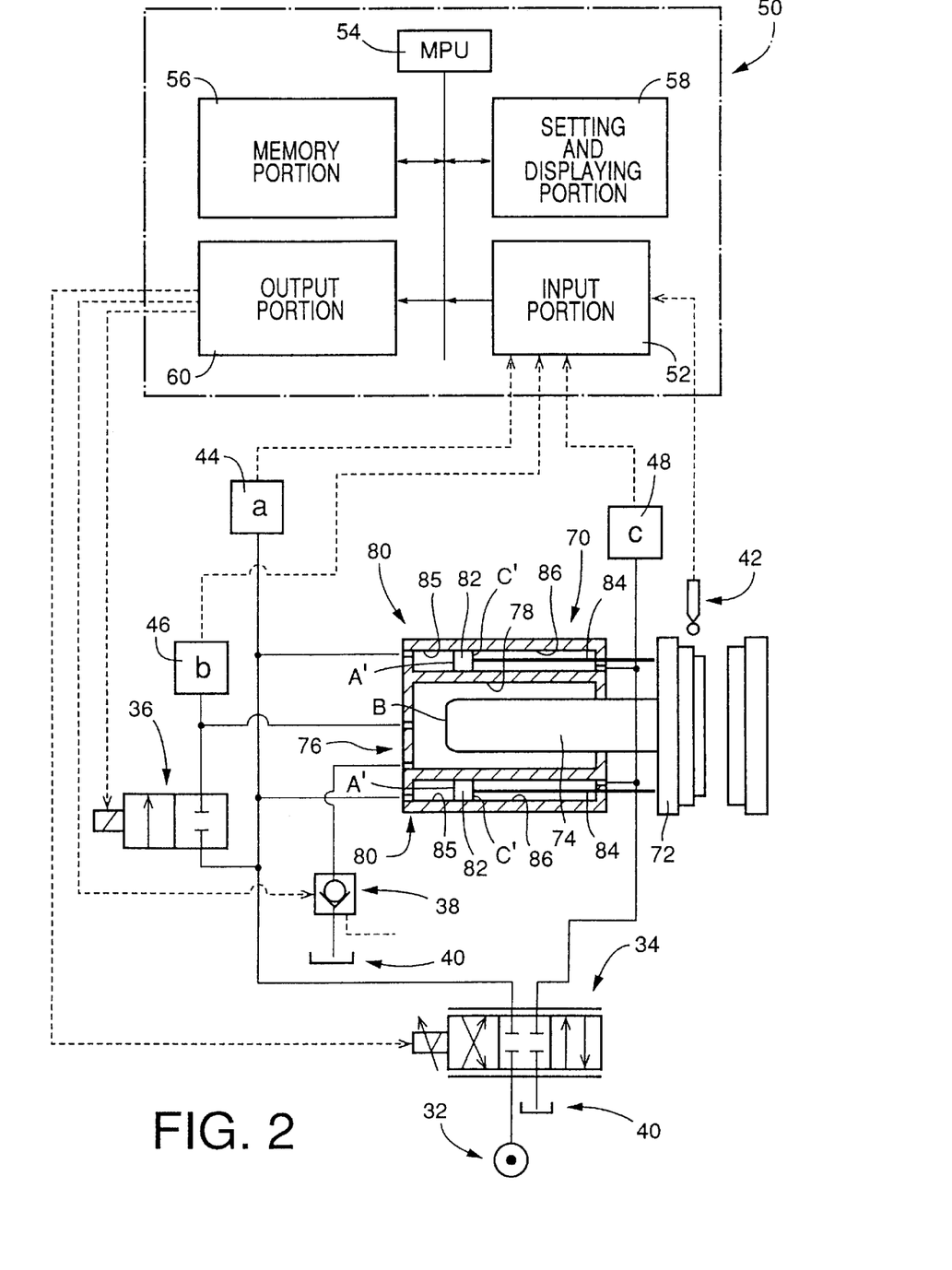
FIG. 2 is a view schematically showing a mold clamping system including a side cylinder type mold clamping device and a control device for controlling a mold clamping pressure of the mold clamping device according to another embodiment of this invention.

Referring next to FIG. 2, there is schematically shown the mold clamping system including a mold clamping apparatus which includes a side cylinder type mold clamping device 70, and the controller 50 for controlling the mold clamping pressure of the mold clamping device 70 according to a second embodiment of this invention. The mold clamping apparatus further includes substantially the same hydraulic device as provided in the first embodiment. In FIG. 2, the same reference numerals as used in FIG. 1 are used to identify the same elements, and redundant description of these elements in the second embodiment will not be provided.

The side cylinder type mold clamping device 70 includes a main cylinder 76, and a main ram 74 which slidably engages the main cylinder 76 so as to be movable relative to the main cylinder 76 in the axial direction. The main ram 74 extends through one of axially opposite end walls of the housing of the main cylinder 76, and carries a movable plate 72 fixed at its front end outside the housing. Like the movable plate 26 in the first embodiment, the movable plate 72 carries a movable mold half of a mold. The main cylinder 76 and the main ram 74 define a main cylinder chamber in the form of a mold clamping chamber 78, and provide a single-acting cylinder-piston mechanism.

The mold clamping device 70 further includes a plurality of auxiliary cylinders 80 which are fixed to the housing of the main cylinder 70 such that the auxiliary cylinders 80 are arranged in the circumferential direction of the main cylinder 70. A piston 82 with a piston rod 84 extending therefrom is slidably received within each auxiliary cylinder 80 such that the piston rod 84 extends through one of axially opposite end walls of the housing of the auxiliary cylinder 80, and is secured at its front end to the movable plate 72. The piston 82 cooperates with the housings of the main cylinder 70 and the housing of each auxiliary cylinder 80 to define a mold closing chamber 85 and a mold opening chamber 86 on the opposite sides of the piston 82.

The movable plate 72 is moved toward the stationary plate (not shown) of the mold, when the hydraulic pressure of the hydraulic pressure source 32 is applied to the mold closing chambers 85 of the auxiliary cylinders 80. The mold is clamped when the hydraulic pressure is also applied to the mold clamping chamber 78. The mold is opened when the hydraulic pressure is applied to the mold opening chambers 86 of the auxiliary cylinders 80. The controller 50 controls the servo valve 34 to regulate the pressures in the chambers 84, 78, 86, for controlling the mold closing, clamping and opening actions of the mold, in substantially the same manner as in the first embodiment.

In this second embodiment, too, the molding closing force F(a), mold clamping force F' and mold opening force F(c) are obtained according to the respective equations (1), (2) and (3) give above. It is noted, however, that the main ram 74 has the effective pressure-receiving surface area B receiving the pressure in the mold clamping chamber 78, and the piston 82 of each auxiliary cylinder 80 has an effective pressure-receiving surface area A' partially defining the mold closing chamber 85 and an effective pressure-receiving surface area C' partially defining the mold opening chamber 86. The effective pressure-receiving surface areas A and C in the above equations (1)–(3) are respectively equal to a sum of the areas A' of all the auxiliary cylinders 80, and a sum of the areas C' of all the auxiliary cylinders 80.

While the two presently preferred embodiments of the present invention have been described above in detail by reference to the accompanying drawings, it is to be understood that the present invention is not limited to the details of the illustrated embodiments, but may be embodied with various changes, modifications and improvements, which may occur to those skilled in the art, without departing from the spirit and scope of the invention defined in the appended claims.

For instance, the hydraulic device includes two mutually independent hydraulic arrangements, one for the mold opening chamber 18, 86, and the other for the mold closing and clamping chambers 20, 16, 85, 78.

What is claimed is:

1. A method of controlling a clamping force of a mold consisting of a movable mold half fixed to a movable plate and a stationary mold half fixed to a stationary plate, in a mold clamping apparatus including a mold clamping device and a hydraulic device, said mold clamping device having a mold closing chamber and a mold clamping chamber for moving said movable plate toward said stationary plate, and a mold opening chamber for moving said movable plate away from said stationary plate, said mold closing, clamping and opening chambers being independent of each other, said hydraulic device including pumping means, a servo valve and a switch valve, said pumping means initially delivering a pressurized working fluid to said mold closing chamber through said servo valve, to move said movable plate toward said stationary plate for thereby closing said mold, and then delivering said pressurized working fluid to said mold clamping chamber through said switch valve as well as said servo valve, to force said movable mold half against said stationary mold half for thereby clamping said mold, said method comprising the steps of:

obtaining a mold clamping force for clamping said mold, on the basis of a sum of a first force based on a pressure in said mold closing chamber and a second force based on a pressure in said mold clamping chamber; and feedback-controlling said servo valve such that said mold clamping force coincides with a desired value.

2. A method according to claim 1, wherein said step of obtaining a mold clamping force comprises obtaining an actual mold clamping force by subtracting a third force based on a pressure in said mold opening chamber from said sum of said first and second forces, and said step of feedback-controlling said servo valve comprises feedback-controlling said servo valve to control the pressure in said mold clamping force such that said actual mold clamping force coincides with a desired mold clamping force.

3. A method according to claim 1, wherein said hydraulic device further includes a reservoir, and a surge valve connected between said mold clamping chamber and said reservoir to permit the working fluid to be introduced from said reservoir into said mold clamping chamber when said pressurized working fluid is delivered to said mold closing chamber to close said mold, said method further comprising the steps of:

obtaining a mold closing force for closing said mold, by subtracting a third force based on a pressure in said mold opening chamber from said first force based on the pressure in said mold closing chamber; and feedback-controlling said servo valve during a closing action of said mold, on the basis of the obtained mold closing force.

4. A method according to claim 1, wherein said hydraulic device further includes a reservoir, and a surge valve connected between said mold clamping chamber and said reservoir, said surge valve being opened to permit the working fluid to be discharged from said mold clamping chamber into said reservoir through said surge valve, by application of a pilot pressure to said surge valve when said pressurized working fluid is delivered through said servo valve to said mold opening chamber to open said mold, said method further comprising the steps of:

obtaining a mold opening force for opening said mold, by subtracting said first force based on the pressure in said mold closing chamber from a third force based on a pressure in said mold opening chamber; and feedback-controlling said servo valve during an opening action of said mold, on the basis of the obtained mold opening force.

5. A mold clamping system for controlling a clamping force of a mold consisting of a movable mold fixed to a movable plate and a stationary mold fixed to a stationary plate, said mold clamping system including a mold clamping apparatus and a control device, said mold clamping apparatus including a mold clamping device and a hydraulic device, said molding clamping device having a mold closing chamber and a mold clamping chamber for moving said movable plate toward said stationary plate, said mold closing and clamping chambers being independent of each other, said hydraulic device including a pumping means, a servo valve and a switch valve, said control device controlling said servo valve and said switch valve such that a pressurized working fluid is initially delivered from said pumping means to said mold closing chamber through said servo valve, to move said movable plate toward said stationary plate for thereby closing said mold, and is then delivered to said mold clamping chamber through said switch valve as well as said servo valve, to force said movable mold half against said stationary mold half for thereby clamping said mold, wherein said control device comprises:

a position sensor for detecting a closed position of said mold;

a first pressure sensor for detecting a pressure of the working fluid in said mold closing chamber;

a second pressure sensor for detecting a pressure of the working fluid in said mold clamping chamber; and a controller for opening said switch valve, upon detection of said closed position of said mold by said position sensor, to deliver the pressurized working fluid from said pumping means to said mold clamping chamber as well as said mold closing chamber, said controller including clamping force obtaining means for obtaining a mold clamping force for clamping said mold, on the basis of a sum of a first force based on the pressure detected by said first pressure sensor and a second force based on the pressure detected by said second pressure sensor, and servo valve controlling means for feedback-controlling said servo valve such that said mold clamping force coincides with a desired value.

6. A mold clamping system according to claim 5, wherein said mold clamping device further has a mold opening chamber for moving said movable plate away from said stationary plate to open said mold, and said control device further includes a third pressure sensor for detecting a pressure of the working fluid in said mold opening chamber, said hydraulic device further including a reservoir, and a surge valve connected between said mold clamping chamber and said reservoir to permit the working fluid to be introduced from said reservoir into said mold clamping chamber when said pressurized working fluid is delivered to said mold closing chamber to close said mold, said clamping force obtaining means obtaining an actual mold clamping force by subtracting a third force based on the pressure detected by said third pressure sensor, from said sum of said first and second forces, said servo valve controlling means feedback-controlling said servo valve to control the pressure in said mold clamping chamber such that said actual mold clamping force obtained by said clamping force obtaining means coincides with a desired mold clamping force.

7. A mold clamping system according to claim 5, wherein said mold clamping device further has a mold opening chamber for moving said movable plate away from said stationary plate to open said mold, and said hydraulic device further includes a reservoir, and a surge valve connected between said mold clamping chamber and said reservoir to permit the working fluid to be introduced from said reservoir into said mold clamping chamber when said pressurized working fluid is delivered to said mold closing chamber to close said mold, said control device further comprising a third pressure sensor for detecting a pressure of the working fluid in said mold opening chamber, said controller further including mold closing force obtaining means for obtaining a mold closing force for closing said mold, by subtracting a third force based on the pressure detected by said third pressure sensor, from said first force based on the pressure detected by said first pressure sensor, said controller feedback-controlling said servo valve such that said mold closing force obtained by said mold closing force obtaining means coincides with a desired value.

8. A mold clamping system according to claim 5, wherein said mold clamping device further has a mold opening chamber for moving said movable plate away from said stationary plate to open said mold, and said control device further includes a third pressure sensor for detecting a pressure of the working fluid in said mold opening chamber, said hydraulic device further including a reservoir, and a surge valve connected between said mold clamping chamber and said reservoir to permit the working fluid to be discharged from said mold clamping chamber into said reservoir through said surge valve, by application of a pilot pressure to said surge valve when said pressurized working fluid is delivered through said servo valve to said mold opening chamber to open said mold, said control device further comprising a third pressure sensor for detecting a pressure of the working fluid in said mold opening chamber, said controller further including mold opening force obtaining means for obtaining a mold opening force for opening said mold, by subtracting said first force based on the pressure detected by said first pressure sensor, from said third force based on the pressure detected by said third pressure sensor, said controller feedback-controlling said servo valve such that said mold opening force obtained by said mold opening force obtaining means coincides with a desired value.

9. A mold clamping system according to claim 5, wherein said mold clamping device includes a main cylinder having a bore, and a main ram which carries said movable plate at one of opposite ends thereof which is located outside said bore, said main ram engaging said bore of said main cylinder such that said main ram is slidably movable relative to said main cylinder and such that the other of said opposite end cooperates with said bore to at least partially define said mold clamping chamber.

10. A mold clamping system according to claim 9, wherein said main ram has a small-diameter portion carrying said movable plate, and a large-diameter portion which is formed integrally with said small-diameter portion and which has a larger diameter than said small-diameter portion, said large-diameter portion cooperating with said bore to at least partially define said mold clamping chamber on one of opposite sides of said large-diameter portion which is remote from said small-diameter portion, and a mold opening chamber on the other of said opposite sides of said large-diameter portion, said main ram being moved away from said stationary plate to open said mold when the pressurized working fluid is delivered from said pumping means to said mold opening chamber, said main ram having a center hole which provides said mold closing chamber, the pressurized working fluid delivered to said center bore acting on said main ram in a direction that moves said main ram toward said stationary plate.

11. A mold clamping system according to claim 9, wherein said mold clamping device further includes a plurality of auxiliary cylinders which are fixed to an outer circumferential surface of said main cylinder and which are arranged in a circumferential direction of said main cylinder such that said auxiliary cylinders extend in a direction of extension of said main cylinder, each of said auxiliary cylinders having a bore and including a piston slidably received in said bore, and a piston rod which is fixed at one of opposite ends thereof to said piston and at the other end to said movable plate, said piston cooperating with said bore of said each auxiliary cylinder to define a first chamber on one of opposite sides of said piston which is remote from said piston rod, and a second chamber on the other side of said piston, said first chambers of said plurality of auxiliary cylinders collectively providing said mold closing chamber, while said second chambers of said plurality of auxiliary cylinders collectively providing a mold opening chamber for moving said movable plate away from said stationary plate to open said mold.

* * * * *